United States Patent
Hammarwall et al.

(10) Patent No.: US 9,172,439 B2
(45) Date of Patent: Oct. 27, 2015

(54) CONFIGURING CHANNEL-STATE INFORMATION RESOURCES USED FOR REFERENCE-SIGNAL-RECEIVED-POWER FEEDBACK

(75) Inventors: David Hammarwall, Vallentuna (SE); Svante Bergman, Hägersten (SE); Niklas Wernersson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 382 days.

(21) Appl. No.: 13/518,007

(22) PCT Filed: Apr. 25, 2012

(86) PCT No.: PCT/SE2012/050430
§ 371 (c)(1),
(2), (4) Date: Jun. 21, 2012

(87) PCT Pub. No.: WO2013/133742
PCT Pub. Date: Sep. 12, 2013

(65) Prior Publication Data
US 2013/0286866 A1    Oct. 31, 2013

Related U.S. Application Data

(60) Provisional application No. 61/606,524, filed on Mar. 5, 2012.

(51) Int. Cl.
*H04B 7/02* (2006.01)
*H04B 7/04* (2006.01)
*H04B 7/06* (2006.01)

(52) U.S. Cl.
CPC .............. *H04B 7/024* (2013.01); *H04B 7/0456* (2013.01); *H04B 7/0617* (2013.01); *H04B 7/0619* (2013.01); *H04B 7/0626* (2013.01)

(58) Field of Classification Search
CPC .......... H04W 72/042; H04W 52/0206; H04W 52/242; H04W 72/005; H04W 72/04; H04W 72/0426
See application file for complete search history.

(56) References Cited

U.S. PATENT DOCUMENTS

2006/0025153 A1* 2/2006 Inaba ......................... 455/456.1
2010/0048217 A1   2/2010 Deshpande et al.
(Continued)

OTHER PUBLICATIONS

3RD Generation Partnership Project. "Aspects on Distributed RRUs with Shared Cell-ID for Heterogeneous Deployments." 3GPP TSG-RAN WG1 #64, R1-110649, Feb. 21-25, 2011, pp. 3-6, 8, 9-11, Taipei, Taiwan.

(Continued)

*Primary Examiner* — David Oveissi
(74) *Attorney, Agent, or Firm* — Murphy, Bilak & Homiller, PLLC

(57) ABSTRACT

The initialization of the CoMP Resource Management Set for a given mobile terminal is based, at least in part, on an estimation of the mobile terminal's geographical location, which can be estimated using network positioning of the mobile terminal. One example method begins with the acquisition (410) by a network node of a geographical position estimate for the mobile terminal of interest. The network node then selects (420) a set of one or more CSI-RS resources for measurement by the mobile terminal, based on the estimated geographical position of the mobile terminal. Finally, the network node configures the mobile terminal to measure the selected CSI-RS resources by sending (430) control information identifying the set to the mobile terminal.

24 Claims, 6 Drawing Sheets

(56) References Cited

U.S. PATENT DOCUMENTS

| | | |
|---|---|---|
| 2010/0323720 A1 | 12/2010 | Jen |
| 2011/0194551 A1 | 8/2011 | Lee et al. |
| 2012/0263145 A1 | 10/2012 | Marinier et al. |
| 2013/0114430 A1* | 5/2013 | Koivisto et al. ............... 370/252 |
| 2013/0260741 A1* | 10/2013 | Yamada .................... 455/422.1 |

OTHER PUBLICATIONS

3RD Generation Partnership Project. "Discussion on Measurement and Reporting Set for CSI Feedback." 3GPP TSG-RAN WG1 #67, R1-113866, Nov. 14-18, 2011, pp. 1-3, San Francisco, CA, USA.

3RD Generation Partnership Project. "Management of CoMP and RRM measurement set." 3GPP TSG-RAN WG1 #68, R1-120627, Feb. 6-10, 2012, pp. 1-3, Dresden, Germany.

* cited by examiner

CONFIGURING CHANNEL-STATE INFORMATION RESOURCES USED FOR REFERENCE-SIGNAL-RECEIVED-POWER FEEDBACK

RELATED APPLICATION

This application claims priority to U.S. Provisional Patent Application Ser. No. 61/606,524, filed 5 Mar. 2012.

BACKGROUND

The present invention generally relates to wireless communications networks, and more particularly relates to techniques for selecting channel-state information resources for use by mobile terminals in providing received-power feedback to the wireless network.

Multi-antenna techniques can significantly increase the data rates and reliability of a wireless communication system. The best improvements in performance are available if both the transmitter and the receiver are equipped with and use multiple antennas, which results in a multiple-input multiple-output (MIMO) communication channel. Such systems and/or related techniques are commonly referred to as MIMO.

Standards for the Long-Term Evolution (LTE) wireless network have been developed by members of the $3^{rd}$-Generation Partnership Project (3GPP). The LTE standard continues to evolve to provide enhanced MIMO support. One core component in LTE is the support of MIMO antenna deployments and MIMO related techniques. For instance, support for a spatial multiplexing mode, which can include the use of channel-dependent precoding, is introduced in Release 10 of the 3GPP standards, which includes a number of new features that are part of an upgrade to LTE technology commonly referred to as LTE-Advanced.

LTE-Advanced's spatial multiplexing mode is aimed for high data rates in favorable channel conditions. An illustration of the spatial multiplexing operation is provided in FIG. 1.

As seen in FIG. 1, information-carrying symbol vector s, which includes symbols from each of several layers, is multiplied by an $N_T \times r$ precoder matrix $N_{T \times r}$. With a properly selected matrix, this precoding operation serves to distribute the transmit energy in a subspace of the $N_T$-dimensional vector space, where the $N_T$ dimensions of the vector space correspond to $N_T$ antenna ports at the transmitter. The precoder matrix is typically selected from a codebook of possible precoder matrices, and is typically indicated by means of a precoder matrix indicator (PMI), which specifies a unique precoder matrix in the codebook for a given number of symbol streams. Each of the r symbols in the symbol vector corresponds to a layer—r is referred to as the transmission rank. In this manner, spatial multiplexing is achieved, since multiple symbols can be transmitted simultaneously, using the same time/frequency resource element (TFRE). The number of symbols r is typically adapted to suit the current channel properties.

LTE uses Orthogonal Frequency-Division Multiplexing (OFDM) in the downlink and Discrete-Fourier-Transform (DFT)—precoded OFDM in the uplink. Hence the received $N_R \times 1$ vector $y_n$ for a certain TFRE on subcarrier n (or alternatively data TFRE number n) can be modeled by:

$$Y_n = H_n W_{N_T \times r} s_n + e_n \quad (1)$$

where $e_n$ is a noise/interference vector obtained as realizations of a random process. The precoder matrix $W_{N_T \times r}$ can represent a wideband precoder, which is constant over frequency, or can be frequency selective.

In order for the mobile terminal (referred to as User Equipment, or UE, in 3GPP terminology) to generate feedback regarding the current channel conditions, a set of pre-defined channel-state-information reference signals (CSI-RS) are transmitted by the base station (referred to as an evolved Node B, or ENB, in 3GPP terminology), for measurement by the mobile terminal. Using the CSI-RS, a UE can estimate the characteristics of the propagation channel between the eNodeB and the UE and consequently also figure out which precoder best suits the particular channel.

In LTE Release 10 and later, there is support for a transmission mode for up to 8-layer spatial multiplexing for eight transmission antennas, meaning that the CSI-RS will be an vector $x_{8 \times 1}$. For the purpose of CSI feedback determination, the UE assumes that each of the rows in $x_{8 \times 1}$ corresponds to an antenna port (ports 15-22) on which a CSI-RS is transmitted. The first row represents antenna port 15, second row antenna port 16 and so on. Each CSI-RS port is typically transmitted from a physical antenna of its own, meaning that there is a direct correspondence between an antenna port and a physical antenna.

To meet the increasing demand for data capacity in the networks, heterogeneous network deployments, sometimes referred to as "HetNet," are seen as an important additional means to provide increased network capacity. With the HetNet approach, relatively low-power transmission nodes/points (often referred to as "pico" or "femto" nodes) are deployed within the coverage area of conventional macro cell nodes. This overlapping of signal coverage, which can be concentrated in user "hot spots" or in areas where signal strength from the macro network is relatively weak, permits significant extensions of high-throughput coverage within the macro network.

FIG. 2 depicts an example of macro and pico cell deployment in a heterogeneous network 100 comprising a macro cell 110 and three pico cells 120. The most basic means to operate a heterogeneous network is to apply frequency separation between the different layers, i.e. between the macro cell 110 and the pico cells 120 in the heterogeneous network 100 in FIG. 2. The frequency separation between the different layers is obtained by allowing the different layers to operate on different non-overlapping carrier frequencies. Another way to operate a heterogeneous network is to share radio resources on same carrier frequencies by coordinating transmissions across macro and pico cells. For example, certain radio resources may be allocated for the macro cells during some time period, while the remaining resources can be accessed by the pico cells without interference from the macro cell. Depending on the traffic situations across the layers, this resource split can change over time to accommodate different traffic demands. In contrast to the above mentioned split of carrier frequencies, this way of sharing radio resources across layers can be made more or less dynamic depending on the implementation of the interface between nodes in the heterogeneous network. In LTE, an X2 interface has been specified in order to exchange different types of information between base station nodes.

The members of 3GPP are currently developing the Release 11 specifications for LTE. These developing standards will include specifications for improved support for coordinated multipoint (CoMP) transmission/reception, where transmissions and receptions are coordinated among several transmission nodes to increase received signal quality and reduce interference. CoMP transmission and reception refers to a system where the transmission and/or reception at multiple, geographically separated antenna sites is coordinated in order to improve system performance. In some cases, the coordination is distributed, in which case equipment at the various transmission sites exchange coordination information. In other cases, the coordination is handled by a central coordinating node that sends coordinating instructions to each of the participating transmission points, as necessary.

CoMP is being introduced in LTE to improve the coverage of high data rates, to improve cell-edge throughput, and to increase system throughput. In particular, the goal is to distribute the user perceived performance more evenly in the network, by taking better control of the interference. CoMP operation targets many different deployment scenarios, supporting coordination between sites and sectors in cellular macro deployments, for example, as well as several configurations of heterogeneous deployments. For instance, with CoMP, a macro node can coordinate its transmission with pico nodes operating within the macro coverage area.

There are several different CoMP transmission schemes that are being considered. One approach is called Dynamic Point Blanking, where multiple transmission points coordinate transmissions so that a neighboring transmission point mutes transmissions on the TFREs that are allocated to UEs that are experiencing significant interference. Another approach is called Dynamic Point Selection, where the data transmission to a UE may switch dynamically (in time and frequency) between different transmission points so that the transmission points are fully utilized. In another approach, called Coordinated Beamforming, transmission points coordinate transmissions in the spatial domain by beaming the transmission power in such a way that the interference to UEs served by neighboring transmission points is suppressed. With another approach, called Joint Transmission, a given transmission to a UE is simultaneously transmitted from multiple transmission points, using the same time/frequency resource.

One common denominator for the various CoMP transmission schemes is that the network needs CSI information not only for the serving transmission point, but also for the radio channels linking neighboring transmission points to a mobile terminal. For that reason, the notion of a CoMP Measurement Set has been introduced in LTE. The CoMP Measurement Set enables the eNodeB to configure a set of CSI-RS resources that the UE will use to perform channel measurements for providing CSI feedback to the network. A CSI-RS resource, which generally corresponds to a particular transmission point, can loosely be described as a pattern of time/frequency resource elements on which a particular CSI-RS configuration is transmitted. A CSI-RS resource is determined by a combination of LTE parameters, including "resourceConfig" and "subframeConfig", which are configured by Radio Resource Control (RRC) signaling. The CSI feedback provided by the UE can include any of several metrics, such as Channel Quality Indicator (CQI), Precoder Matrix Indicator (PMI), and Rank Indicator (RI).

It should be noted that the CoMP Measurement Set must be limited to a small number of CSI-RS resources, since the UE processing becomes increasingly complex (prohibitive) with large configurations. Accordingly, the CoMP Measurement Set will likely be limited to two or three CSI-RS resources, although larger set sizes are possible.

To obtain the full benefits of CoMP, it is important that the network (e.g., the eNodeB) is able to configure the most appropriate CoMP Measurement Set for each UE, so that the UE performs channel measurements for the correct neighboring transmission points, using the CSI-RS resources that correspond to those transmission points. Since the size of the CoMP Measurement Set will be constrained to a small number, the room for error in the configuration is small. Accordingly, it is an agreed working assumption for LTE Release 11 to introduce a new, simpler measurement and corresponding measurement report, for measurements performed on a configured set of CSI-RS resources. 3GPP has recently named these resources the "CoMP Resource Management Set." Basic signal received power measurements (and/or received quality measurements) are thus made on a more extensive set of CSI-RS resources than could practically be assigned to a CoMP Measurement Set; by evaluating these CSI-RS based received powers/qualities for a larger set of CSI-RS resources, an eNodeB can configure the UE with the most appropriate CoMP Measurement Set. For example, the eNodeB might define the CoMP Measurement Set to include the N (e.g., two) CSI-RS resources with the highest reported reference signal received powers/qualities in the CoMP Resource Management Set. The UE can then begin the more excessive measurements and reporting to provide CSI (PMI/CQI/RI) feedback for the relatively few CSI-RS resources of the configured CoMP Measurement Set. Moreover, such reported reference signal received powers/qualities can be used to configure appropriate interference measurements in a UE; for example, it can be used to configure one, or multiple, Interference Measurement Resources (IMR), for a UE.

Accordingly, it is an agreed working assumption for LTE Release 11 that the network can configure a UE to report reference signal received powers based on measurements performed on CSI-RS resources configured in a CoMP Resource Management Set. Such a measurement could be done coherently, in which case the UE needs to know the particular CSI-RS sequence that is transmitted on the CSI-RS resource, or incoherently, in which case the transmitted actual sequence can be unknown, i.e., "transparent," to the UE. In either case, an estimated signal power/quality corresponding to the CSI-RS resource and derived from the measurement performed on the CSI-RS resource is fed back from the UE to the eNodeB. In the discussion that follows, the fed back reference signal received power/quality values are collectively referred to as "CSI-RS received power" (CSI-RSRP), but it should be understood that CSI-RSRP encompasses any quantity that represents a received quality of a CSI-RS signal.

As mentioned above, the network configures the terminal to measure CSI-RSRP on a set of CSI-RS resources, which set is referred to herein as the CoMP Resource Management Set. In other contexts this set might also be referred to as the "RRM Measurement Set", "CoMP RRM Measurement Set", "CSI-RSRP Measurement Set", or "Extended CoMP Measurement Set," for example. The CoMP Resource Management Set provides a useful tool for the eNodeB to acquire information on which transmission points (i.e., which CSI-RS resources) are most suitable for inclusion in the CoMP Measurement Set, such as the two or three transmission points having the highest CSI-RSRP.

Even though measurements of CSI-RSRP are substantially less computationally complex than a full CSI (CQI/PMI/RI) report, there is nonetheless a UE complexity involved. For that reason, the CoMP Resource Management Set will be limited in the maximum allowed size, i.e., limited in the number of CSI-RSRP measurements the UE shall be capable of performing. A likely limit in CSI-RSRP size is on the order of five to eight.

SUMMARY

In several embodiments of the present invention, the initialization of the CoMP Resource Management Set for a given mobile terminal is based, at least in part, on an estimation of the mobile terminal's geographical location, which can be estimated using network positioning of the mobile terminal.

Several example methods according to the present invention can be implemented by a radio base station or other fixed node in a wireless network. One example method begins with the acquisition of a geographical position estimate for the mobile terminal of interest. The network node then selects a set of one or more CSI-RS resources for measurement by the mobile terminal, based on the estimated geographical position of the mobile terminal. Finally, the network node configures the mobile terminal to measure the selected CSI-RS resources by sending control information identifying the set to the mobile terminal.

The estimated position for the mobile terminal can be used in combination with other information for initiating the CSI-RS measurement set. For example, in some embodiments, uplink measurements might be used to narrow the set of transmission points under consideration, when available. In other embodiments, CRS-based measurements of RSRP provided by the mobile terminal may be used in a similar fashion. In still other embodiments, the estimated geographical position of the mobile terminal may be used to identify an initial set of transmission points for consideration, while a trial-and-error approach is used to narrow the set to determine the measurement set.

Variations of the above method are also disclosed. One such variant begins with the acquisition of a geographical position estimate for the mobile terminal of interest and continues with the identification of a set of relevant transmitting nodes, based on the estimated position. These nodes may be identified, for example, on the basis of their geographic distance from the mobile terminal, or based on their "distance" in a radio sense, as discussed in further detail below, or based on some combination thereof. Thus, for example, the identified set may include all transmitting nodes within a certain distance of the mobile terminal, or a predetermined number of transmitting nodes having the shortest distances to the mobile terminal, or a combination of both, such as only transmitting nodes having less than a predetermined distance to the mobile terminal, up to a predetermined maximum set size.

The method continues with the selection of one or more CSI-RS resources for measurement by the mobile terminal from CSI-RS resources corresponding to the relevant transmitting nodes. This may include, for example, narrowing down the relevant set using any of a variety of criteria, such as whether the nodes fall within one or more predetermined CoMP "clusters," or based on other signal related information such as uplink measurement data or CRS-based measurement reports from the mobile terminal, or the like. Finally, the network node transmits control data to the mobile terminal to identify the selected set of CSI-RS resources.

Base station apparatus and other network node apparatus adapted to carry out any of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
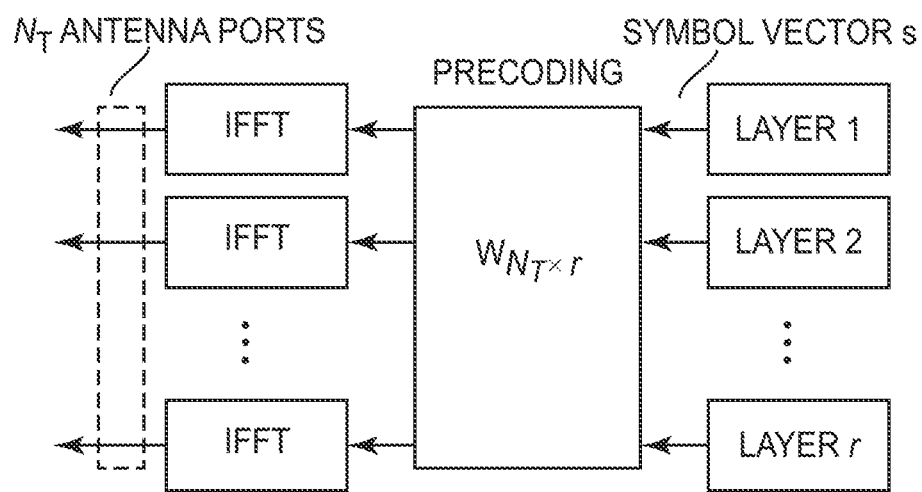
FIG. 1 illustrates the transmission structure for precoded spatial multiplexing mode in LTE.
Figure 2:
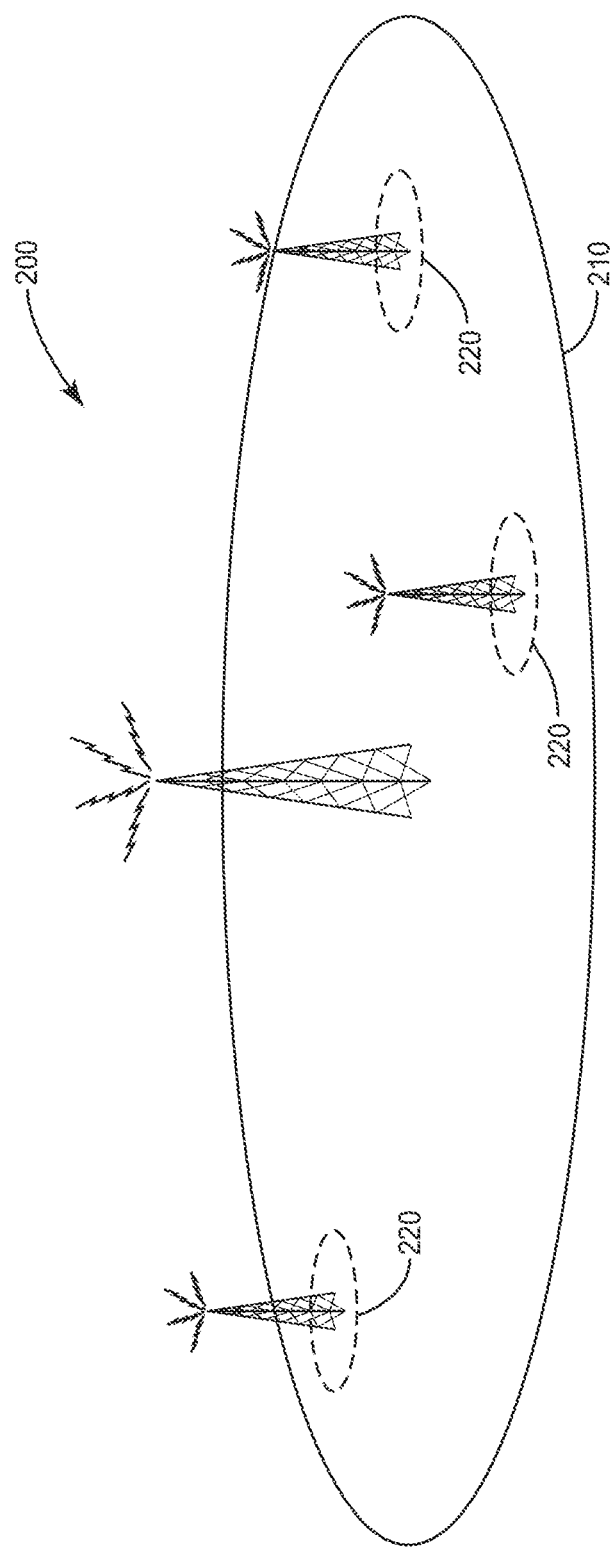
FIG. 2 illustrates a heterogeneous cell deployment in a wireless network.

While terminology from 3GPP LTE and LTE-Advanced is used herein to describe several examples of the present invention, this should not be seen as limiting the scope of the invention to only that system. Other wireless systems may also benefit from exploiting the ideas covered within this disclosure. Likewise, it should be appreciated that while several of the signals described herein are characterized with respect to an OFDM system, the signals mentioned in this disclosure can represent signals in other domains than in the time-frequency grid of an OFDM system.

Large CoMP clusters are expected to be increasingly common in the future. This is particularly likely to be the case for heterogeneous deployments, where a large number of pico nodes distributed across a macro cell may be closely coordinated with a macro eNodeB. As a result, there are likely to be many CoMP deployments where the number of cooperating nodes exceeds the limit on the allowed CSI-RSRP set size. In such a scenario, there is a problem in selecting which CSI-RS resources should be included in the CoMP Resource Management Set.

In this scenario, the eNodeB should autonomously resolve which transmission points are relevant or irrelevant for inclusion in the CoMP Resource Management Set. Possible autonomous techniques include techniques based on uplink measurements performed on signals transmitted by UEs, such as measurements on uplink sounding reference signals (SRS). Other possibilities include trial and error approaches where the network randomly tries different configurations until a satisfying match is acquired. Still other possible techniques are based on Reference Signal Received Power (RSRP) measurements performed by mobile terminals on common reference symbols (CRS), and provided to the eNodeB as part of existing mobility management procedures.

Each of these general approaches for allowing the eNodeB to autonomously configure the CoMP Resource Management Set fails to provide a complete solution, as each has specific limitations. For instance, resorting to uplink measurements has several limitations. One problem relates to deployments with downlink inter-frequency carrier aggregation. Since it is unlikely that all terminals in a given area support an uplink carrier aggregation that exactly matches the downlink carrier aggregation configuration, it will not be possible to perform uplink measurements relevant for all carriers. Another problem with approaches based on uplink measurements is that there may be a significant downlink power imbalance between transmission points, such as between macro transmission points and pico transmission points. Hence, even when there is significant downlink received power at a UE, the uplink received power at the macro node may be insufficient for proper signal detection and estimation. Still further, acquiring relevant uplink absolute power levels between different transmission points requires that physically separated receiver chains must be calibrated to yield comparable power measurements. Even further, there is an implementation disadvantage in introducing coupling between uplink and downlink processing.

Resorting to a trial and error approach has the disadvantage that it may take the network a long time to resolve the relevant CoMP Resource Management Set. Moreover, this approach requires excessive RRC reconfigurations of the UEs, causing additional overhead and unpredictable UE behavior during transition periods.

Resorting to CRS-based RSRP measurements that are normally used for mobility management purposes has the disadvantage that there may not be a one-to-one mapping between a CRS and a transmission point. For example, a primary scenario under evaluation for LTE Release 11 CoMP operation is the HetNet deployment, where all pico nodes share the same Cell-ID as the macro node. In these deployments, the CRS is transmitted by all of the pico nodes and the macro node, and the nodes are indistinguishable from a CRS perspective. Hence, it is not possible to use associated RSRP mobility measurements to identify precisely which nodes should be included in the CoMP Resource Management Set.

In several embodiments of the present invention, then, these problems are avoided by basing, at least in part, the initialization of the CoMP Resource Management Set for a given mobile terminal on an estimation of the mobile terminal's geographical location. This location can be estimated using network positioning of the mobile terminal. In some embodiments, for example, an eNodeB triggers a positioning request of a UE, and then utilizes the geographical position response to select CSI-RS resources associated with the transmission points that are most relevant for the UE's geographic position.

Existing LTE standards, as of Release 9, specify technologies for network-based positioning of mobile terminals, which enable the network to determine the geographical position of a terminal in the network. One reason for introducing this positioning technology was to comply with regulatory requirements on operators for emergency services such as E911 in North America, E112 in Europe and 110 in China. These regulatory requirements set requirements on geographical positioning in terms of accuracy as well as speed. Moreover, location based services is considered a key driver for new services to drive future revenue growth from mobile services.

More particularly, in LTE Release 9 an advanced framework was introduced for positioning based on Observed Time Difference of Arrival (OTDOA), where the network transmits positioning reference symbols (PRS) that are used by the terminal to perform accurate timing measurements on signals from each of several base stations (evolved nodeB's, or eNBs, in 3GPP terminology). The OTDOA-based estimate of the mobile terminal's geographic position is calculated by either the mobile terminal or by a positioning node in the fixed network, such as an evolved Serving Mobile Location Center (E-SMLC).

Figure 3:
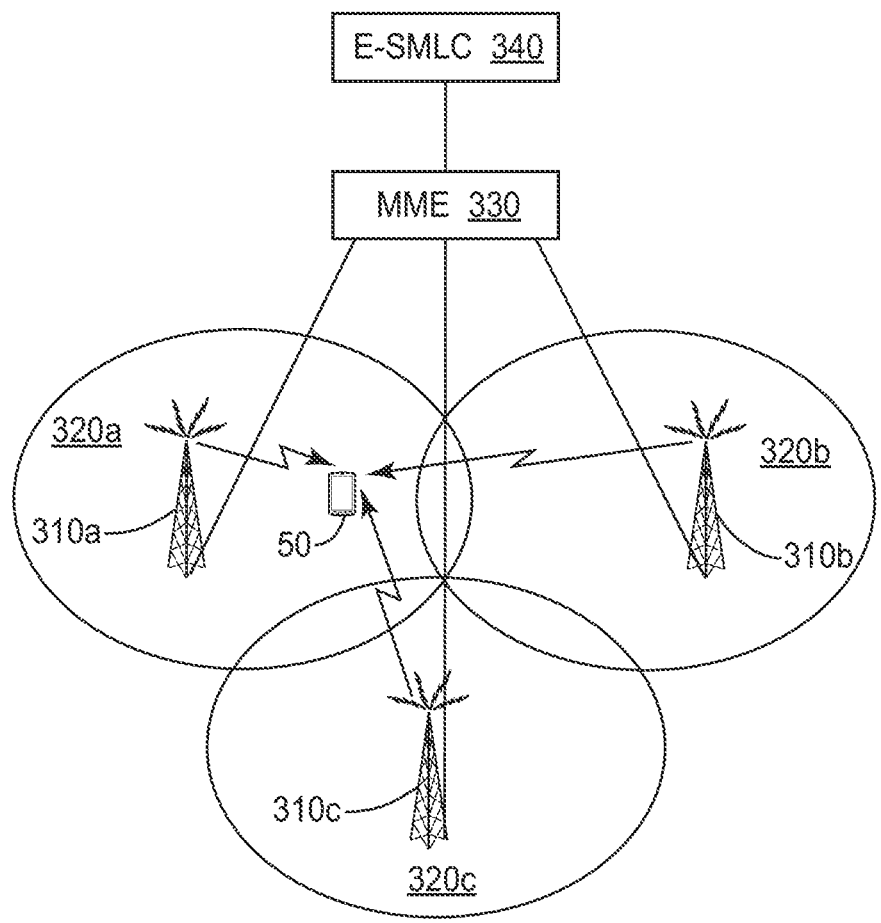
FIG. 3 illustrates network components involved in obtaining a geographic position for a mobile terminal.

FIG. 3 illustrates a wireless communication system that includes positioning components. A wireless device such as a user equipment (UE) 350 is wirelessly connected to a radio base station (RBS) 350a, which in the LTE context is commonly referred to as an evolved NodeB (eNodeB). Each eNodeB 310a-c serves one or more areas each referred to as cells 320a-c, and are connected to the core network. In LTE, the eNodeBs 310a-c are connected to a Mobility Management Entity (MME) 330 in the core network. A positioning node, also called a location server, is connected to the MME 130. The positioning node is a physical or logical entity that manages positioning for a so-called target device, i.e. a wireless device that is being positioned, and is referred to as an Evolved Serving Mobile Location Center (E-SMLC) 340. As illustrated in FIG. 3, the E-SMLC 340 may be a separate network node, but it may also be a functionality integrated in some other network node.

Any of several nodes in the wireless network can trigger and query a positioning measurement and report, by means of the LTE Positioning Protocol (LPP). A typical positioning procedure can be summarized as follows: a location service request (positioning request) for a particular target UE 350 is triggered by an entity in the network, for example an eNodeB 310 or the UE 350, and is received by the MME 330, which is a key control-node in the LTE network architecture. The MME 330 forwards the location request to the E-SMLC 340, which initiates eNodeB procedures and UE procedures for determining and reporting the geographical position for the UE 350. The E-SMLC 340 then signals the positioning response to the MME 330, which in turn forwards the response to the entity that initiated the positioning query.

Figure 4:
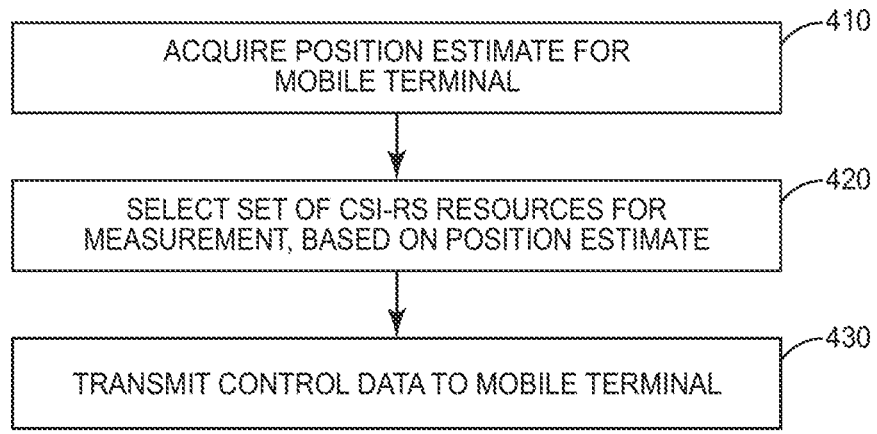
FIG. 4 is a process flow diagram illustrating an example technique for determining a set of CSI-RS resources for measurement by a mobile terminal.

FIG. 4 illustrates a flow chart for one example method according to the present invention, as might be implemented by a radio base station or other fixed node in a wireless network. As shown at block 410, the illustrated process begins with the acquisition of a geographical position estimate for the mobile terminal of interest. While a network-triggered technique based on the use of OTDOA technology may be used, in some embodiments, it will be appreciated that other sources of geographic position estimates for the mobile terminal and/or other positioning technologies may be used, in others.

As shown at block 420, the network node then selects a set of one or more CSI-RS resources for measurement by the mobile terminal, based on the estimated geographical position of the mobile terminal. Finally, the network node configures the mobile terminal to measure the selected CSI-RS resources by sending control information identifying the set to the mobile terminal, as shown at block 430.

It should be noted that the estimated position for the mobile terminal can be used in combination with other information for selecting the CSI-RS measurement set. For example, in some embodiments, uplink measurements might be used to narrow the set of transmission points under consideration, when available. In other embodiments, CRS-based measurements of RSRP provided by the mobile terminal of interest or by other mobile terminals may be used in a similar fashion. In still other embodiments, the estimated geographical position of the mobile terminal may be used to identify an initial set of transmission points for consideration, while a trial-and-error approach is used to narrow the set to determine the measurement set.

Figure 5:
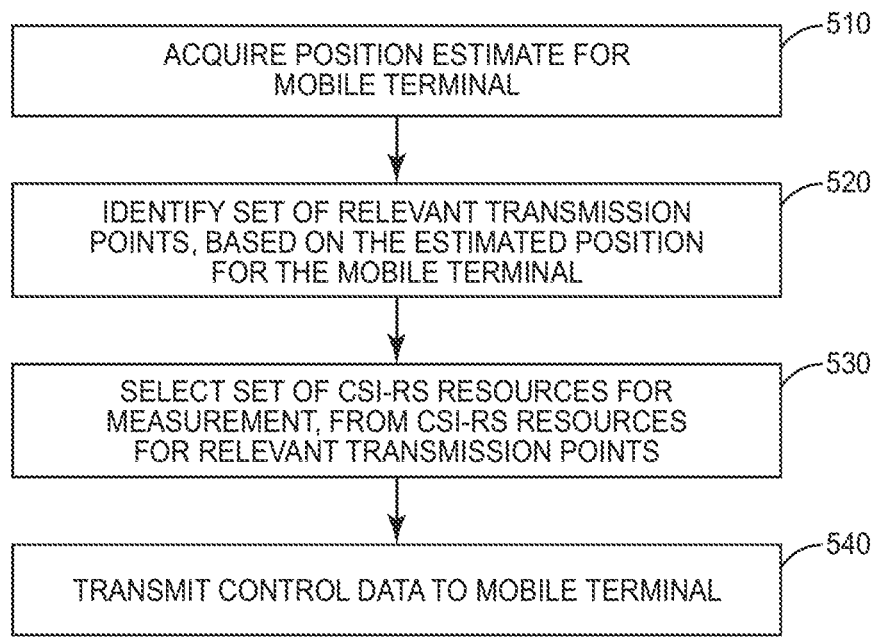
FIG. 5 is a process flow diagram illustrating another example technique for determining a set of CSI-RS resources for measurement by a mobile terminal.

The flow chart given in FIG. 5 illustrates a variation of the method pictured in FIG. 4. As with the earlier method, the method illustrated in FIG. 5 begins, as shown at block 510, with the acquisition of a geographical position estimate for the mobile terminal of interest. As shown at block 520, the method continues with the identification of a set of relevant transmitting nodes, based on the estimated position. These nodes may be identified, for example, on the basis of their geographic distance from the mobile terminal, or based on their "distance" in a radio sense, as discussed in further detail below, or based on some combination thereof. Thus, for example, the identified set may include all transmitting nodes within a certain distance (whether a geographic, i.e., Euclidean, distance or a "radio-distance") of the mobile terminal, or a predetermined number of transmitting nodes having the shortest distances to the mobile terminal, or a combination of both. For instance, the identified set might include only transmitting nodes having less than a predetermined distance to the mobile terminal, up to a predetermined maximum set size, in some embodiments.

The illustrated method continues with the selection of one or more CSI-RS resources for measurement by the mobile terminal from CSI-RS resources corresponding to the relevant transmitting nodes, as shown at block 530. This may include, for example, narrowing down the relevant set using any of a variety of criteria, such as whether the nodes fall within one or more predetermined CoMP "clusters," or based on other signal related information such as uplink measurement data or CRS-based measurement reports from the mobile terminal, or the like. Finally, as shown at block 540, the network node transmits control data to the mobile terminal to identify the selected set of CSI-RS resources.

As suggested above, while the selection of the CSI-RS resources for measurement by the mobile terminal is based at least partly on the estimated geographical location of the mobile terminal, other information may be used as well to determine a relevant set of transmitting points from which to select corresponding CSI-RS resources, or to select particular CSI-RS resources from available CSI-RS resources, or both. Thus, for example, in some embodiments of the invention, CSI-RS resources associated with transmission points that are close (in some distance measure) to the acquired geographical position estimate are selected as candidates for inclusion in the CoMP Resource Management Set, e.g. The selected transmission points might include the associated N closest transmission points, for example, or transmission points closer than a target threshold.

In some of these embodiments, CSI-RS resources for all of the candidate transmission points selected according to their distances from the mobile terminal can be included in the CoMP Resource Management Set. Alternatively, there can be a down-selection procedure based on other information available at the eNodeB. For example, one such down-selection process could be to eliminate CSI-RS patterns belonging to transmission points outside a CoMP Cluster, i.e., discarding from consideration those transmission points that cannot participate in a potential CoMP transmission and/or reception.

Alternatively, in other embodiments of the invention, CSI-RS resources associated with transmission points that are distant (in some distance measure) to the acquired geographical position estimate are removed as candidates for inclusion in the CoMP Resource Management Set. For example, the selected set of CSI-RS resources for measurement by the mobile terminal may be limited to exclude those corresponding to the N most distant transmission points, or to exclude those transmission points more distant than a target threshold distance.

In several example embodiments discussed above, the "distances" between the mobile terminal and various transmission points are used to identify a set of relevant transmission points, or to select particular CSI-RS resources, or both. In some embodiments, of course, this distance is a geographic distance, e.g., a two-dimensional or three-dimensional distance calculated according to Euclidean geometry. It should be understood, however, that embodiments of the invention are not limited to using a geographic or Euclidean distance. Rather, in various embodiments of the invention, the "distance" discussed above can be a "radio-distance."

For the purposes of this disclosure, with respect to a radio link between a pair of nodes, the term "radio-distance" refers to any of a variety of metrics that characterize the physical radio link and that directly influence the received power at a receiving node of the pair. Non-limiting examples of metrics that can be used to describe radio-distance include: a geographic (Euclidean) distance between the pair of radio nodes, including distances calculated using two or three dimensions; a radio signal propagation time between the pair of radio nodes, including propagation times that account for transmissions that travel by paths other than the shortest path from a Euclidean sense; the inverse of measured received signal power, which may include measurements retrieved from a database of mapped measurements; the inverse of estimated and/or modeled received signal power, including estimates calculated according to models that account for special physical characteristics of the environment and/or that account for directive antenna gain associated with one or more transmission points; and combinations of two or more of the above. While some of these metrics are discussed in further detail below, it will be appreciated that other examples of radio-distance might also be used.

In some embodiments, the radio-distance metric used in the selection of CSI-RS resources for measurement by a given mobile terminal is based on the propagation time delay between each of several transmission points and the mobile terminal, whether a measured propagation time or a modeled estimate. This radio-distance measure has the advantage that simplifies the removal of transmission points that would violate system specific constraints on propagation time delay, for instance cyclic prefix or other timing requirements for robust CSI measurements.

In another embodiment, the radio-distance measure is an estimate of the inverse received signal power. Hence, a UE at a position with good reception to a particular transmission point will be considered close, and a UE with poor reception to a particular transmission point will be considered distant. This measure has the advantage of also incorporating the effects of potentially different transmission powers from different nodes, as well as the effects of the attenuation in the radio propagation channel.

In some embodiments, the inverse received signal power at the mobile terminal from a given transmission point is estimated by modeling. In some cases, this may involve the application of a simple distance-dependent path loss model, although more sophisticated models incorporating more detailed knowledge of the environment may be used. In one such embodiment the inverse received signal power is estimated using a model taking parameters including a Euclidean distance and transmission power as input.

One advantage of even the simplest example of such a model is that it better represents the estimated CSI-RSRP value than a traditional Euclidean geometric distance does, with very modest additional complexity. Such a mapping can, for example, have the form:

$$\frac{1}{RxPower} \approx \alpha \frac{d^\beta}{TxPower}, \qquad (2)$$

where $\alpha$ and $\beta$ are parameters of the model, and d is the Euclidean geographic distance (measured in two or three dimensions).

A refined embodiment could also include antenna gain in the path loss modeling, which can in some cases depend on the position of the UE relative to a particular transmission point. This is particularly true for sectorized antennas, where the received signal at the UE can be heavily suppressed if the UE is outside the main antenna lobe. The antenna gain dependent path loss model can, for example, be modeled as:

$$\frac{1}{RxPower} \approx \alpha \frac{d^\beta}{TxPower} \cdot A(\varphi), \quad (3)$$

where $A(\phi)$ is the antenna gain for a terminal as a function of azimuth direction $\phi$. The azimuth direction is readily derived from the relative geographical positions of the UE and the transmission point, and the antenna gain function is a characteristic of the antenna deployed at the transmission point. The antenna gain function can thus either be measured or be estimated by way of a model fitted to it. Alternatively, the gain could be rudimentarily approximated; for example, the antenna gain could be set to 1 within the relevant sector, and 0 outside.

One key benefit of including the antenna gain in the distance function is that in sectorized deployments the azimuth angle from the transmission point is equally as important as the Euclidean distance to it. Thus, for example, if the UE is outside the relevant sector, the received signal will be weak, regardless of the distance to the transmission point.

In another group of embodiments, the inverse received signal power or some other radio-distance metric is estimated from a mapping between measured received power for each transmission point and geographical position. Such a mapping can, for example, be established based on previous positioning and CSI-RSRP measurements from UEs. Such an embodiment has the advantage that it accounts for the physical propagation environment that is actually experienced by a UE.

It will be appreciated that the radio-distance measure could also be a combination of the above embodiments, e.g., a linear weighting of the distance measures above, or some other combination. Radio-distance metrics based on signal quality measures or radio environment characteristics other than those described above are also possible.

Any of the techniques described above can be implemented in connection with a wireless network node, such as a radio base station. An example of such a radio base station is an eNodeB configured according to Release 11 specifications for LTE. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

Figure 6:
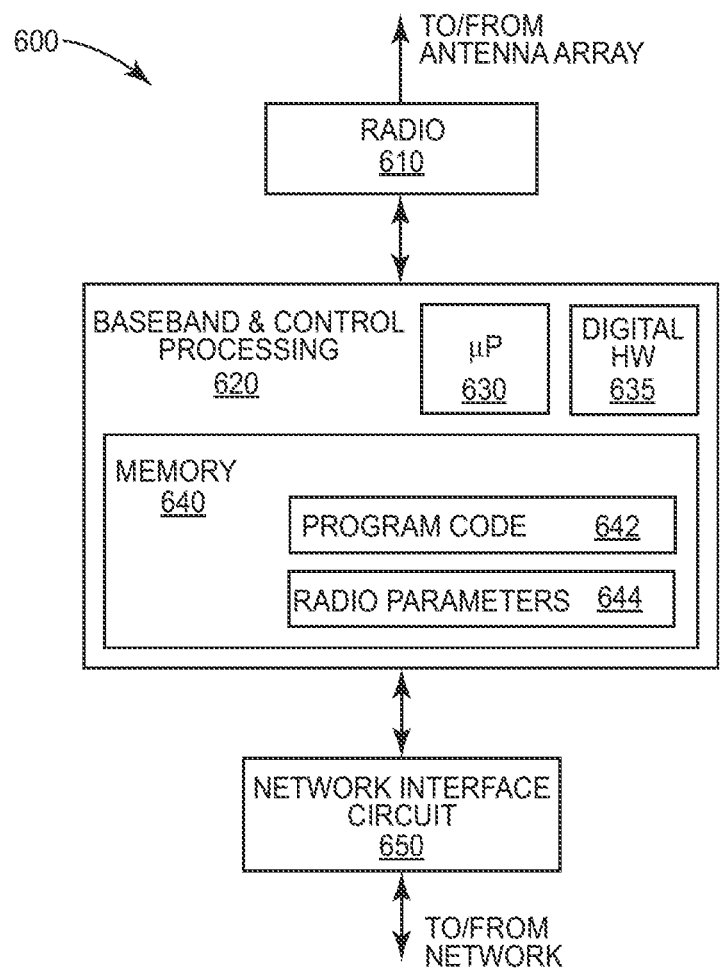
FIG. 6 is a block diagram illustrating some components of an example base station according to some embodiments of the present invention.

FIG. 6 is a block diagram illustrating some components of a base station 600, illustrating a few of the components relevant to the present techniques. Other wireless nodes according to various embodiments of the present invention may have a similar structure, but without the radio interface.

The pictured apparatus includes radio circuitry 610 and baseband & control processing circuit 620. Radio circuitry 610 includes receiver circuits and transmitter circuits that use known radio processing and signal processing components and techniques, typically according to a particular telecommunications standard such as the 3GPP standard for LTE and/or LTE-Advanced. Because the various details and engineering trade-offs associated with the design and implementation of such circuitry are well known and are unnecessary to a full understanding of the invention, additional details are not shown here.

Baseband & control processing circuit 620 includes one or more microprocessors or microcontrollers 630, as well as other digital hardware 635, which may include digital signal processors (DSPs), special-purpose digital logic, and the like. Either or both of microprocessor(s) 630 and digital hardware may be configured to execute program code 642 stored in memory 640, along with radio parameters 644. Again, because the various details and engineering tradeoffs associated with the design of baseband processing circuitry for mobile devices and wireless base stations are well known and are unnecessary to a full understanding of the invention, additional details are not shown here.

Base station 600 further includes a network interface circuit 650, which is configured for communication with other nodes in the wireless network. In LTE eNodeBs, in particular, this network interface circuit is configured to communicate with other eNodeB's using the X2 interface defined by 3GPP specifications, as well as with one or more Mobility Management Entities (MMES) using 3GPP's S1 interface. Positioning data for mobile terminals may be requested and received via this network interface circuit, using well known techniques such as 3GPP's LPP.

The program code 642 stored in memory circuit 640, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 644 include various pre-determined configuration parameters as well as parameters determined from system measurements, such as channel measurements, and may include, for example, information defining CoMP clusters, parameters relating uplink carriers to downlink carriers according to a pre-determined, static configuration, or according to a signalled configuration, e.g., via RRC signaling, etc.

Accordingly, in various embodiments of the invention, processing circuits, such as the baseband & control processing circuits 620 of FIG. 6, are configured to carry out one or more of the techniques described above for selecting and applying reference signal sequences for use with enhanced control channels. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 7:
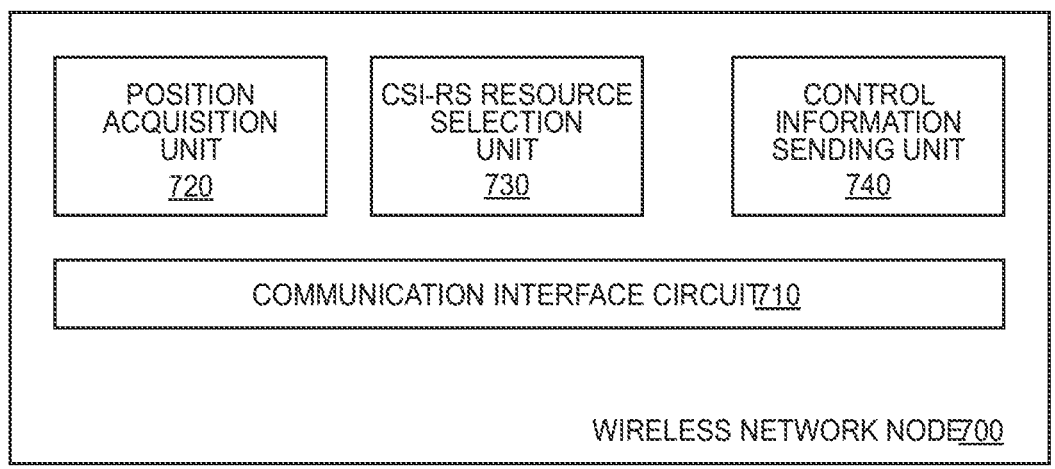
FIG. 7 is another block diagram illustrating functional elements of an example wireless network node configure d according to several embodiments of the present invention.

While FIG. 6 illustrates an example configuration of hardware elements for several embodiments of the invention, the block diagram of FIG. 7 illustrates functional aspects of an example wireless node according to some implementations of the invention. It will be appreciated that one, several, or all of the functional components of the apparatus pictured in FIG. 7 can be implemented using all or part of a hardware structure similar to that of FIG. 6.

The wireless network node 700 illustrated in FIG. 7 is configured to determine a set of channel-state-information reference signal (CSI-RS) resources for measurement by a mobile terminal operating in a wireless network. Wireless network node 700 includes a communication interface circuit 710 for communicating with other nodes in the wireless network. In an eNodeB implementation, for example, the communication interface circuit may be configured to communicate with other eNodeBs over an X2 interface, for instance, and to communicate with the core network (including an MME) via an S1 interface. In a radio base station implementation, communication interface circuit 710 also includes circuitry arranged for communicating with mobile terminals over a radio access network (RAN) interface, via local radio circuitry and/or via one or more remote radio heads.

Network node 700 further includes a position acquisition unit 720, which is configured to acquire a geographical position estimate for the mobile terminal. Position acquisition 720 may obtain the position estimate from an E-SMLC, via communication interface circuit 710, for example, in an LTE network. Network node 700 further includes a CSI-RS resource selection unit 730, which is configured to select a set of one or more CSI-RS resources for measurement by the mobile terminal, where the selection is based on the estimated geographical position of the mobile terminal, as discussed in detail above. Finally, network node 700 includes a control information sending unit, which is configured to send control information to the mobile terminal, the control information identifying the selected set of one or more CSI-RS resources.

Several embodiments of the present invention provide a robust solution for initializing a CoMP Resource Management Set that is effective in a wide range of scenarios, including scenarios where uplink measurements are not available or are inaccurate. Moreover, the disclosed techniques provide a fast mechanism to establish the CoMP Resource Management Set that can avoid trial-and-error behavior in the network, along with the lengthy initialization delay and increased RRC configuration overhead associated with the trial-and-error approach.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method implemented in a wireless network node for determining a set of channel-state-information reference signal (CSI-RS) resources for measurement by a mobile terminal operating in a wireless network, the method comprising:
   acquiring a geographical position estimate for the mobile terminal;
   selecting a set of one or more CSI-RS resources for measurement by the mobile terminal, based on the estimated geographical position; and
   transmitting control information identifying the selected set of one or more CSI-RS resources to the mobile terminal.

2. The method of claim 1, wherein selecting the set of one or more CSI-RS resources for measurement by the mobile terminal comprises:
   determining estimated radio-distances between the mobile terminal and each of a plurality of transmitting nodes, based on the estimated geographical position for the mobile terminal; and,
   based on the estimated radio-distances, selecting CSI-RS resources corresponding to one or more of the transmitting nodes for inclusion in the set of one or more CSI-RS resources for measurement by the mobile terminal.

3. The method of claim 2, wherein selecting CSI-RS resources for inclusion in the set of one or more CSI-RS resources for measurement by the mobile terminal comprises including in the set of one or more CSI-RS resources for measurement by the mobile terminal a predetermined number of CSI-RS resources corresponding to transmitting nodes having the shortest estimated radio-distance.

4. The method of claim 2, wherein selecting CSI-RS resources for inclusion in the set of one or more CSI-RS resources for measurement by the mobile terminal comprises including in the set of one or more CSI-RS resources for measurement by the mobile terminal only CSI-RS resources corresponding to transmitting nodes having an estimated radio-distance less than a predetermined threshold.

5. The method of claim 1, wherein selecting the set of one or more CSI-RS resources for measurement by the mobile terminal comprises:
   identifying a set of relevant transmitting nodes based on the estimated geographical position; and
   selecting the set of one or more CSI-RS resources for measurement by the mobile terminal from CSI-RS resources corresponding to the relevant transmitting nodes.

6. The method of claim 5, wherein identifying the set of relevant transmitting nodes based on the estimated geographical position comprises:
   determining estimated radio-distances between the mobile terminal and each of a plurality of transmitting nodes; and
   including in the set of relevant transmitting nodes a predetermined number of the transmitting nodes having the shortest estimated radio-distance.

7. The method of claim 5, wherein identifying the set of relevant transmitting nodes based on the estimated geographical position comprises:
   determining estimated radio-distances between the mobile terminal and each of a plurality of transmitting nodes; and
   including in the set of relevant transmitting nodes all of the transmitting nodes having an estimated radio-distance less than a predetermined threshold.

8. The method of claim 2, wherein determining estimated radio-distances between the mobile terminal and each of a plurality of transmitting nodes comprises estimating, for each transmitting node, one or more of:

a geographic distance between the mobile terminal and the transmitting node;
a propagation time between the mobile terminal and the transmitting node;
an inverse of measured received signal power at the mobile terminal; and
an inverse of a modeled received signal power for the mobile terminal.

9. The method of claim 8, wherein determining estimated radio-distances between the mobile terminal and each of a plurality of transmitting nodes comprises, for at least one transmitting node, estimating the inverse of a modeled received signal power at the mobile terminal based on a path loss model that accounts for direction-dependent antenna gain for the at least one transmitting node.

10. The method of claim 2, wherein selecting the set of one or more CSI-RS resources for measurement by the mobile terminal comprises discarding from consideration those nodes that are not members of one or more predetermined clusters of transmission points that can be coordinated.

11. The method of claim 2, wherein the selected set of one or more CSI-RS resources for measurement by the mobile terminal comprise a CoMP Resource Management Set, the method further comprising:
receiving reference signal received power measurement data for the CoMP Resource Management Set, from the mobile terminal; and
configuring a CoMP Measurement Set for the mobile terminal, based on an evaluation of the reference signal received power measurement data.

12. A wireless network node configured to determine a set of channel-state-information reference signal (CSI-RS) resources for measurement by a mobile terminal operating in a wireless network, the wireless network node comprising a network interface circuit, and
a processing circuit configured to:
acquire a geographical position estimate for the mobile terminal;
select a set of one or more CSI-RS resources for measurement by the mobile terminal, based on the estimated geographical position; and
send control information to the mobile terminal, wherein the control information identifies the selected set of one or more CSI-RS resources.

13. The wireless network node of claim 12, wherein the wireless network node is a radio base station.

14. The wireless network node of claim 13, wherein the processing circuit is configured to select the set of one or more CSI-RS resources for measurement by the mobile terminal by:
determining estimated radio-distances between the mobile terminal and each of a plurality of transmitting nodes, based on the estimated geographical position for the mobile terminal; and,
based on the estimated radio-distances, selecting CSI-RS resources corresponding to one or more of the transmitting nodes for inclusion in the set of one or more CSI-RS resources for measurement by the mobile terminal.

15. The wireless network node of claim 14, wherein the processing circuit is configured to select CSI-RS resources for inclusion in the set of one or more CSI-RS resources by including in the set of one or more CSI-RS resources for measurement by the mobile terminal a predetermined number of CSI-RS resources corresponding to transmitting nodes having the shortest estimated radio-distance.

16. The wireless network node of claim 14 wherein the processing circuit is configured to select CSI-RS resources for inclusion in the set of one or more CSI-RS resources by including only CSI-RS resources corresponding to transmitting nodes having an estimated radio-distance less than a predetermined threshold.

17. The wireless network node of claim 12, wherein the processing circuit is configured to select the set of one or more CSI-RS resources for measurement by the mobile terminal by:
identifying a set of relevant transmitting nodes based on the estimated geographical position; and
selecting the set of one or more CSI-RS resources for measurement by the mobile terminal from CSI-RS resources corresponding to the relevant transmitting nodes.

18. The wireless network node of claim 16, wherein the processing circuit is configured to identify the set of relevant transmitting nodes based on the estimated geographical position by:
determining estimated radio-distances between the mobile terminal and each of a plurality of transmitting nodes; and
including in the set of relevant transmitting nodes a predetermined number of the transmitting nodes having the shortest estimated radio-distance.

19. The wireless network node of claim 17, wherein the processing circuit is configured to identify the set of relevant transmitting nodes based on the estimated geographical position by:
determining estimated radio-distances between the mobile terminal and each of a plurality of transmitting nodes; and
including in the set of relevant transmitting nodes all of the transmitting nodes having an estimated radio-distance less than a predetermined threshold.

20. The wireless network node of claim 14, wherein the processing circuit is configured to determine estimated radio-distances between the mobile terminal and each of a plurality of transmitting nodes by estimating, for each transmitting node, one or more of:
a geographic (Euclidean) distance between the mobile terminal and the transmitting node;
a propagation time between the mobile terminal and the transmitting node;
an inverse of measured received signal power at the mobile terminal; and
an inverse of a modeled received signal power for the mobile terminal.

21. The wireless network node of claim 20, wherein the processing circuit is configured to determine estimated radio-distances between the mobile terminal and each of a plurality of transmitting nodes by, for at least one transmitting node, estimating the inverse of a modeled received signal power at the mobile terminal based on a path loss model that accounts for direction-dependent antenna gain for the at least one transmitting node.

22. The wireless network node of claim 14, wherein the processing circuit is configured to select the set of one or more CSI-RS resources for measurement by the mobile terminal by discarding from consideration those nodes that are not members of one or more predetermined clusters of transmission points that can be coordinated.

23. The wireless network node of claim 12, wherein the processing circuit is further configured to:
receive reference signal received power measurement data for the CoMP Resource Management Set, from the mobile terminal; and configure a CoMP Measurement Set for the mobile terminal, based on an evaluation of the reference signal received power measurement data.

24. A wireless network node configured to determine a set of channel-state-information reference signal, CSI-RS, resources for measurement by a mobile terminal operating in a wireless network, the wireless network node comprising a communication interface circuit for communicating with other nodes in the wireless network, the wireless network node comprising:

means for acquiring a geographical position estimate for the mobile terminal;

means for selecting a set of one or more CSI-RS resources for measurement by the mobile terminal, based on the estimated geographical position; and means for sending control information to the mobile terminal, wherein the control information identifies the selected set of one or more CSI-RS resources.

\* \* \* \* \*